Figure 1:
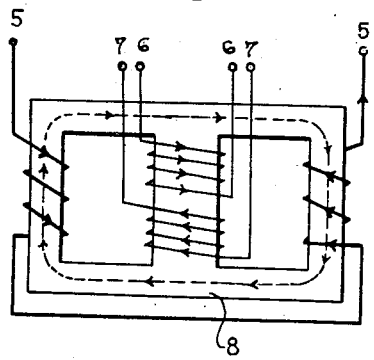

Nov. 10, 1925.

A. S. FITZ GERALD 1,560,934

ALTERNATING ELECTRIC CURRENT PROTECTIVE APPARATUS

Filed July 18, 1923   7 Sheets-Sheet 1

INVENTOR

Alan Stewart FitzGerald

Nov. 10, 1925.    1,560,934
A. S. FITZ GERALD
ALTERNATING ELECTRIC CURRENT PROTECTIVE APPARATUS
Filed July 18, 1923    7 Sheets-Sheet 2

INVENTOR
Alan Stewart Fitz Gerald

Nov. 10, 1925.  
A. S. FITZ GERALD  
ALTERNATING ELECTRIC CURRENT PROTECTIVE APPARATUS  
Filed July 18, 1923  
1,560,934  
7 Sheets-Sheet 3

INVENTOR  
Alan Steward FitzGerald

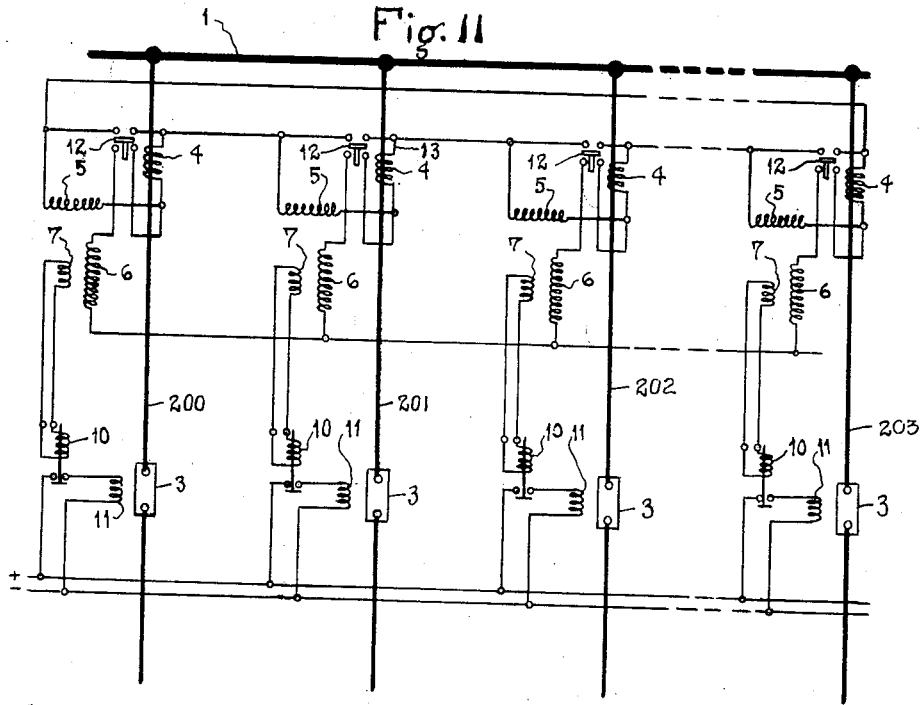
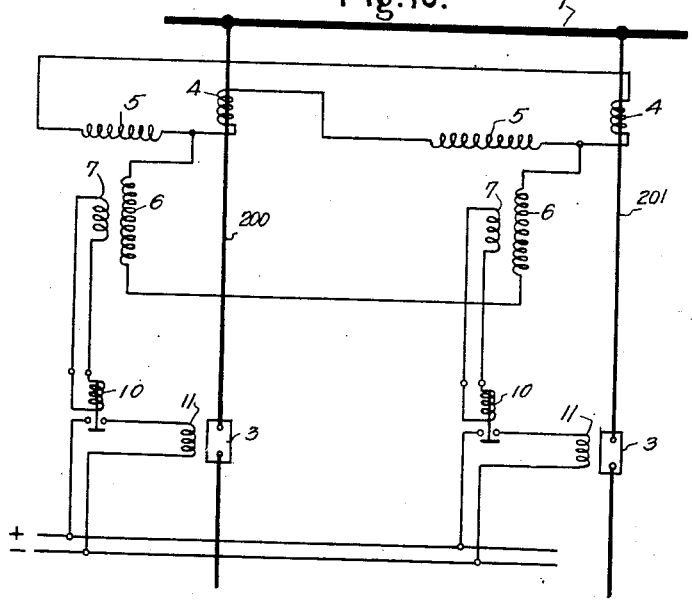

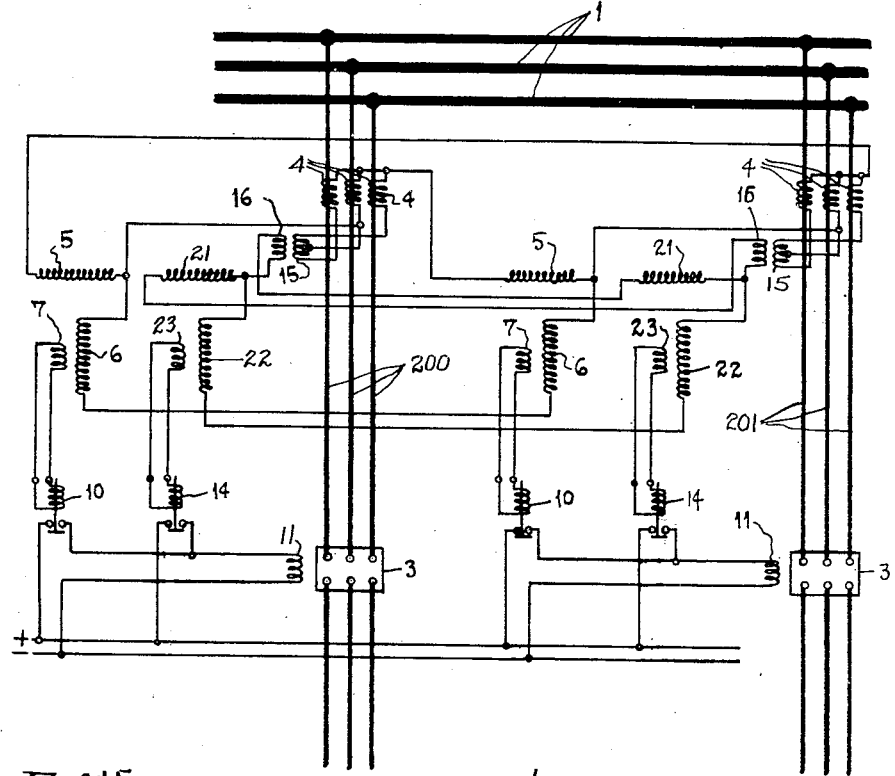
Fig.15
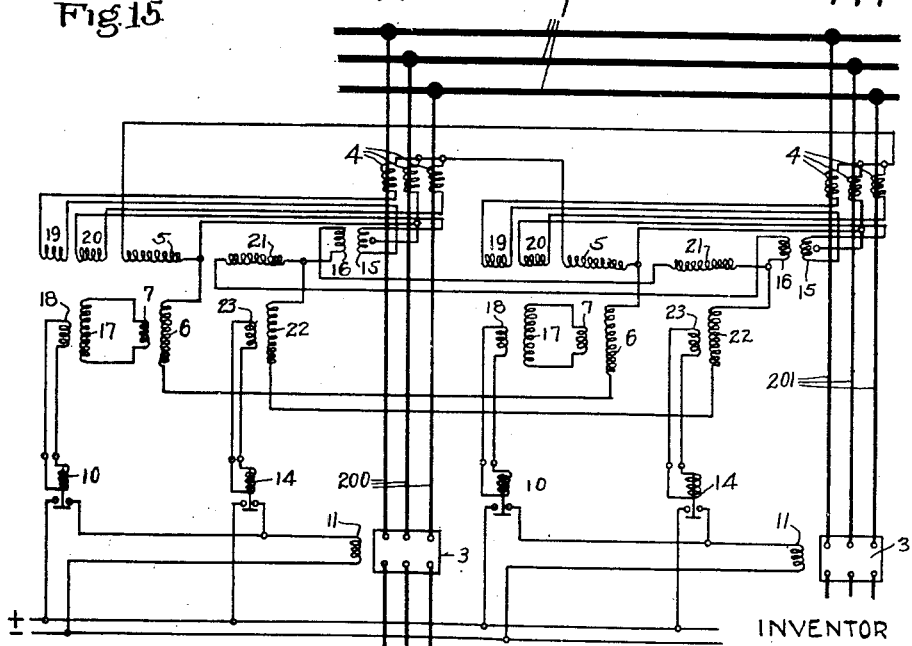
INVENTOR
Alan Stewart FitzGerald

Patented Nov. 10, 1925.

1,560,934

UNITED STATES PATENT OFFICE.

ALAN STEWART FITZ GERALD, OF FINCHLEY, ENGLAND, ASSIGNOR TO GENERAL ELECTRIC COMPANY, A CORPORATION OF NEW YORK.

ALTERNATING-ELECTRIC-CURRENT PROTECTIVE APPARATUS.

Application filed July 18, 1923. Serial No. 652,276.

*To all whom it may concern:*

Be it known that I, ALAN STEWART FITZ GERALD, a subject of the King of Great Britain, residing at Finchley, in the county of Middlesex, England, have invented certain new and useful Improvements in Alternating-Electric-Current Protective Apparatus, of which the following is a specification.

My invention relates to alternating current protective apparatus of the type which, upon faults occurring in any section of a distribution or other circuit, automatically operates to disconnect the faulty section. More specifically my invention relates to the protection of parallel conductors by means of electro-responsive devices adapted to cause disconnection of any one of a number of parallel conductors should the same carry a current greater than that proportion of the total current carried by the said conductor when operating under normal conditions. My invention also provides protection against leakage faults to earth with or without simultaneous protection against line faults.

An object of my invention is to provide means for protecting parallel feeders, without the use of balanced arm or other form of differential relay and to that end it consists in the employment of a differentially acting biasing transformer which is in general similar to that disclosed in my Letters Patent 1,468,441 of the United States for protective device for electric distribution systems, issued September 18, 1923 and assigned to the same assignee as this invention, and which may operate in conjunction with any convenient form of relay of the simplest possible kind.

This biasing transformer comprises a static electric transformer having a core on which are mounted a primary winding, connected to receive operating current, a secondary winding inductively related to the primary winding and a restraining winding so disposed as to produce substantially no electromotive force at the terminals of the primary and secondary windings but adapted to receive current which regulates the flux set up by the primary winding caused by any given operating current.

In applying my invention to the protection of parallel alternating electric current circuits, a biasing transformer is associated with and operatively connected to each individual circuit. The circuits may be provided with current transformers, the secondary windings of which are interconnected so that current normally circulates between them. This current is used to excite the restraining windings of the biasing transformers. The primary or operating windings of the biasing transformer may be connected between points of the circulating current circuit normally at equal potential so that they do not receive operating current unless there is a difference of potential between these points indicating that the secondary winding of one current transformer is providing more current than the other or others on account of its primary circuit carrying a greater current than normal, due to a fault on the line for example. The effective action of the operating current in the primary winding of the biasing transformer on the secondary winding of this device is however restrained by the current in the restraining windings so that if all the parallel circuits to be protected are carrying overload current any difference current in the primary winding of the biasing transformer due to imperfect adjustment of the current transformers on the lines will be restrained from inducing a tripping current in the secondary winding of the biasing transformer.

The arrangement may be modified in the case of two parallel lines or circuits by restraining the operation of the biasing transformer of one line by current proportional to that in the other line. This can be done by exciting from the current transformer of one line the operating winding of its associated biasing transformer and the restraining winding of the other biasing transformer in series. With this arrangement the biasing transformer will be adjusted so that equal currents in the operating and restraining windings of the same biasing transformer will not cause operation of the tripping relay.

A further object of my invention is to provide for the automatic disconnection of one of the circuits of a polyphase distribution system having a number of parallel circuits when a fault to earth or between phases occurs. The biasing transformers are arranged in various circuit arrangements hereinafter described and claimed by which these objects are achieved.

Figure 6:
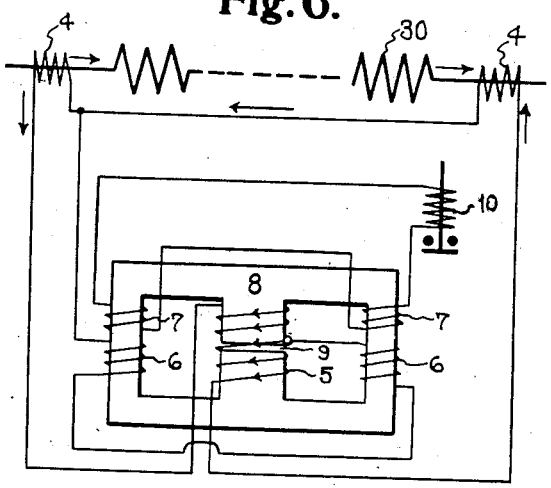
Figure 7:
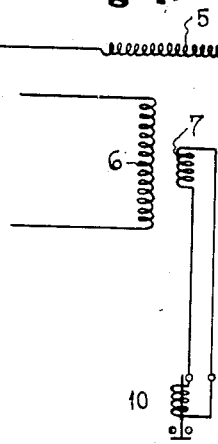
Figure 8:
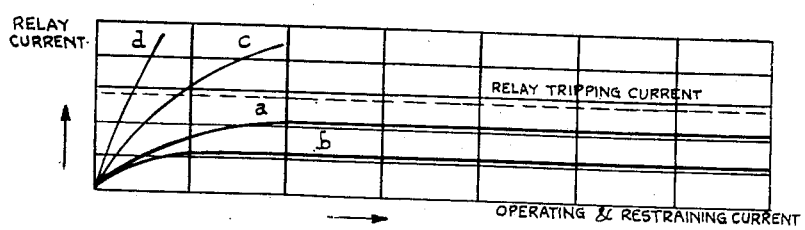

My invention is illustrated in the accompanying drawings in which Figures 1 to 5 inclusive illustrate various forms of the biasing transformer. Figure 6 shows a biasing transformer in connection with a protective circuit. Figure 7 illustrates the conventional diagram used in Figures 10 to 16 inclusive to represent biasing transformers. Figure 8 shows curves to illustrate the action of the biasing transformer and Figures 9 to 16 inclusive show circuit arrangements for the protection of alternating electric current distribution systems according to my invention.

Referring now to Figure 1 the laminated three legged core 8 is provided with a primary winding 6 and a secondary winding 7, mounted on the central limb. These two windings are inductively related and the flux set up by the primary winding 6 threads the secondary winding 7 and divides in the outer limbs of the core which forms the return path. On the outer limbs the two parts of the restraining winding 5 are mounted. Magnetic flux set up by these restraining windings circulates only in the outer frame of the core because the two parts of the winding are wound in such a manner that their effects in the central limb mutually cancel one another. Thus winding 5 is so disposed as to produce substantially no electromotive force at the terminals of either of the windings 6 or 7. If a heavy current is passed through winding 5, it saturates the outer limbs of the core and diminishes the inductive relation between windings 6 and 7. Variation of the current strength in winding 5 varies the inductive relation between windings 6 and 7 between maximum and minimum values.

Figure 2:
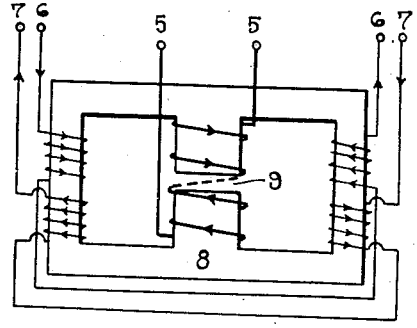

The arrangement of Figure 2 shows the restraining winding 5 mounted on the central core and the primary winding and secondary windings both divided into two parts, each part of each winding being mounted on an outer limb. Flux set up by the restraining winding 5 divides in the outer limbs of the core and the parts of the windings 6 and 7 are wound so that any current induced in one part of a winding is opposed by the current induced in the other part of the same winding. Thus winding 5 is so disposed as to produce substantially no electromotive force at the terminals of the windings 6 and 7 but these latter windings are inductively related to each other. Current in winding 5 regulates the inductive relation between windings 6 and 7. Due to the air gap 9 in the magnetic path of the restraining winding, only large currents in winding 5 will saturate the core.

Figure 3:
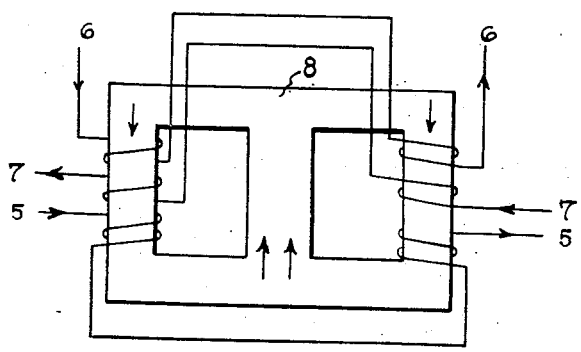
Figure 4:
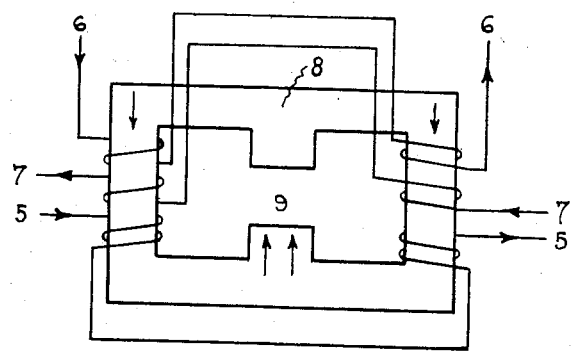

The arrangement of Figure 3 acts similarly to those of Figure 1 and Figure 2 but in this case all three windings are mounted on the outer limbs and therefore all are divided into two parts. This form of biasing transformer is preferred for the reason that there is less leakage of magnetic flux than in the two previous arrangements. The arrows show the magnetic path of the flux set up by the two parts of the restraining winding. The flux set up by the primary winding 6 only circulates in the outer frame of the core. Figure 4 only differs from Figure 3 by the provision of the air-gap 9 in the flux path of the restraining winding which is useful in certain cases referred to hereinafter.

Figure 5:
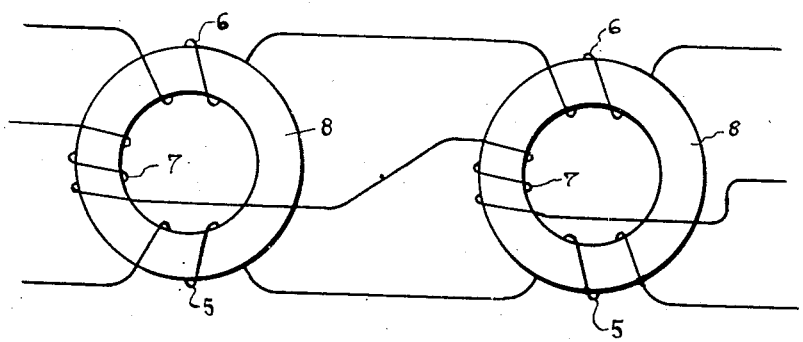

Figure 5 is a modification of the biasing transformer of Figure 3 in which two separate ring cores replace the three-legged core. In this construction, the windings 6 and 7 are distributed with a section on each core and are so wound as to be inductively related whereas the two parts of restraining winding 5 are wound in opposition as regards their action on the other two windings, that is so as to produce substantially no electromotive force at the terminals of the windings 6 and 7. The action is the same as in the previous cases of Figures 1 to 4 inclusive. No air-gap is provided in this form because, although it would increase the reluctance of the magnetic path of the restraining winding, it would also do the same for the other two windings and thus diminish their inductive relation which normally is required to be of high value.

Figure 6 shows a typical application of a biasing transformer to a well-known circulating current protective system. Winding 30, which may be a transformer winding for example, is provided with a current transformer 4 at both ends. The secondary windings are connected for circulating current as shown by the arrows and this circuit contains the restraining winding 5. Equi-potential points of this circuit starting from the mid-point of winding 5 are connected by a conductor containing the two parts of primary winding 6. If the transformer winding 30 develops a fault, the two current transformers 4 will no longer furnish equal currents and current will therefore flow in winding 6 inducing current in winding 7 so as to trip relay 10. If, however, winding 30 is heavily overloaded and otherwise sound, any lack of adjustment between current transformers 4 magnified by the overload and causing current to flow in winding 6 will not be effective inductively on winding 7 because the core 8 is already saturated due to the current in restraining winding 5.

Figure 7 indicates in a conventional diagram the manner in which these respective windings are shown in the present specification, 5 being the restraining winding, 6 the operating winding, and 7 the secondary winding respectively. In all the following diagrams except Figure 9, this convention will be adhered to, namely, the restraining winding 5 horizontal, the operating winding 6 the longer of the two vertical windings and the secondary winding 7 the shorter of the vertical windings.

The operation of the biasing transformer in the circuits hereinafter described will be more easily understood if reference be made to the curve in Figure 8 in which is shown the relation between operating current, restraining current and current in the relay. By suitably proportioning the number of turns in the operating and restraining windings, I may arrange that equal currents in operating and restraining windings of any magnitude shall give rise to the relay current represented by curve $a$. The current at which the relay is set to trip is represented by the dotted line. If the restraining current is proportional to the operating current, but greater than the same, the corresponding curve will lie below $a$, as for instance curve $b$. If on the other hand, the restraining current is proportional to, but less than the operating current, we should get a curve similar to $c$. Were no restraining current present, the relation between operating current and relay current would of course be approximately proportional as indicated by curve $d$.

Figure 9:
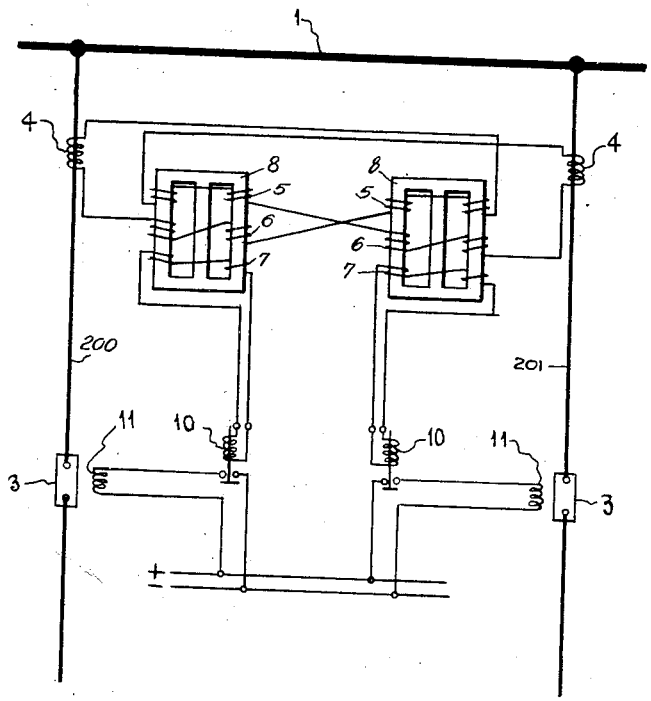

In Figure 9, I show the simplest application of the biasing transformer to a simple parallel circuit, comprising parallel feeders 200 and 201, connected to a common bus bar 1, and provided with current transformers 4, either of equal ratio, should the feeders normally carry equivalent currents, or having such ratio that their secondary currents are equivalent when their primaries are carrying a normally divided load. To the secondary of each current transformer, I connect in series the operating winding 6 of the biasing transformer adjacent thereto, and the restraining winding 5 of that associated with the other feeder. To the secondary windings 7 of each biasing transformer, I connect relays 10, arranged to close a circuit derived from any convenient source, whereby trip coils 11 are energized, causing circuit breakers 3 to be opened.

The action of the protective circuit is as follows:—

Under all conditions of operation not involving faults on the feeders 200, 201, the current circulating in any operating winding will always be exactly equivalent to that flowing in each restraining winding.

The relation between the turns on the operating windings 6 and the restraining windings 5 is such that equal currents flowing therein are insufficient to cause the operation of the relays 10, as previously described. It will be seen therefore that the operation of either of the relays 10 can only occur in the event of its adjacent feeder carrying a current greater than that in the other feeder, since the biasing transformer of the sound feeder is restrained to a greater extent than that of the faulty feeder. A form of biasing transformer without airgap is preferred in this case.

Figure 10 is a single phase diagram representing an arrangement comprising parallel feeders 200 and 201, connected to a common bus bar 1, and provided with current transformers 4, either of equal ratio, should the feeders normally carry equivalent currents, or having such ratio that their secondary currents are equivalent when their primaries are carrying a normally divided load. Associated with each feeder is a biasing transformer 5, 6, 7. I form a closed secondary circuit comprising the secondaries of the current transformers 4, and the restraining windings 5 of the biasing transformers, the polarity being such that the electromotive forces are in the same direction in the closed circuit, and current therefore normally circulates in this circuit.

Between equi-potential points as shown in the figures, I connect in series the operating windings 6, and to the secondary winding 7, I connect the coils 10 of simple relays arranged to energize the trip coils 11 and open the circuit breakers 3. The action of the protective circuit is as follows:—

Under all conditions of operation not involving faults on the feeders 200 and 201, current circulates in the secondary windings of the current transformers 4 and the restraining windings 5 of the biasing transformers. There is then no current in the operating winding 6, and consequently in the secondary winding 7, and the relays are not energized.

In the event of extremely heavy overloads occurring on other parts of the system, the parallel feeders 200 and 201 may be liable to carry currents very greatly in excess of normal load, and under such conditions it is found that small differences in the primary current due to lack of exact equality in the impedance of the line conductors of negligible magnitude under normal considerations, may be sufficient to provide a considerable difference current in the operating winding 6, unless means be provided to preclude this. Differences in the construction of the current transformers 4, may also give rise to the same effect under heavy overloads. Due, however, to the fact that under overload conditions, abnormally heavy currents will circulate in the restraining windings 5, difference current in the operating winding 6 will not give rise to currents in the secondary winding 7 of corresponding magnitude, and no operation of the relays 10 will result. Should, however, a fault occur on either of the feeders 200 and 201, a greater current will be found in the faulty feeder than in the healthy one, and a corresponding difference current will flow in the operating winding 6.

The relation between the turns on the operating winding 6 and the restraining windings 5 may be such that equal currents flowing therein are insufficient to cause the operation of the relays 10. It will be seen, therefore, that the operation of either of the relays 10 can only occur in the event of its adjacent feeder carrying a greater current than the other feeder, since the biasing transformer of the sound feeder is restrained to a greater extent than that of the faulty feeder. If there be incorporated an air-gap in the core of the biasing transformer the restraint applied to the healthy feeder under conditions approximating to its normal load, may be negligible, with a view to the maximum sensitivity being obtained on a fault occurring when both feeders are normally loaded.

In Figure 11, I show an arrangement similar to that in Figure 10 but suitable for the protection of more than two feeders 200, 201, 202 and 203, a biasing transformer 5, 6, 7 being provided for each feeder. In this case as in Figure 10 no current flows in any of the operating windings, except there be a fault on one of the feeders, and after the same manner, the relay associated with the faulty feeder will be operated due to the fact that the biasing transformer from which it is operated will have flowing in its operating winding a current proportional to the difference current between the faulty feeder and one of the adjacent ones, whereas in its restraining winding there will be found a current proportional to that in one of the sound adjacent feeders. In the case of two feeders considered in Figure 10, it is of course understood that no protective means are available in the event of only one of the two feeders being in service. In Figure 11, however, where the protection of multiple feeders is concerned, should one of the feeders be taken out of service; it is still necessary to provide means for protecting such feeders as remain.

To this end, therefore, I provide an auxiliary switch 12 arranged to open-circuit the operating winding of the dead feeder, and to short-circuit the restraining winding and current transformer as shown. The auxiliary switches are shown in mid position. When all the feeders are in service, the lower contacts will be closed but when one or more of the feeders is out of service, the corresponding auxiliary switch or switches will be on the upper contacts. This will provide correct and adequate protection for all the remaining feeders, since, as heretofore, a faulty feeder will invariably receive a greater operating current in relation to the restraining current, whereas the converse will occur on any healthy feeder on the occurrence of a fault.

As an alternative, I may arrange for the auxiliary switch 12 to close the same circuit as indicated above, but to open the connection to the current transformer as at the point 13. Both of these arrangements give correct protection on the remaining feeders when one feeder is out of commission, but in certain cases it is preferable to use the latter arrangement in order to preclude transient energization of relays associated with healthy feeders during the movement of the oil circuit breaker.

The auxiliary switch 12 should in all cases complete its operation previous to the opening of the oil circuit breaker contacts, and the auxiliary switch 12 may accordingly be operated mechanically, electrically, or by any other convenient means, and should preferably be actuated in accordance with the movement of the circuit breaker 3, whether the cause of the operation of the latter be relay 10, or any other operating means.

The biasing transformer 5, 6, 7 of Figures 10 and 11 is used with an arrangement providing overload and discriminating bias and no air-gap need be employed in the core. However, a small air-gap gives the best results.

In all the previous diagrams a single phase arrangement is shown with a view to simplification of the diagram, but it is to be understood that the arrangement may be applied to polyphase systems in an analogous manner.

Figure 12:
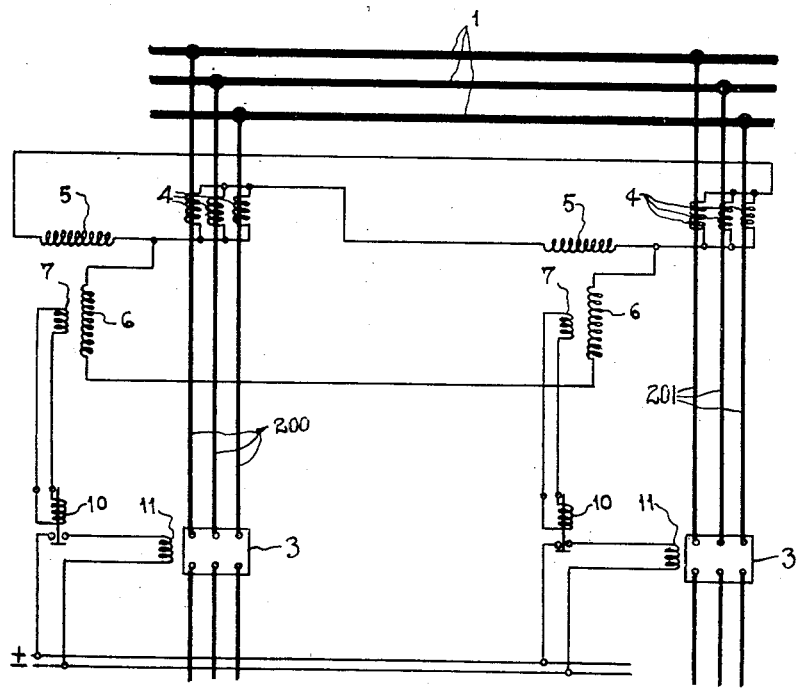

Figure 12 shows an arrangement for a pair of three phase feeders 200 and 201 supplied by the common bus bars 1 and each provided with a biasing transformer 5, 6, 7. The current transformers 4 on each feeder are connected together in parallel as shown so that normally currents circulate in the secondary windings but the vectorial sum of the current is zero. The parallel connected secondary windings of the two sets of current transformers 4 are arranged in a protective circuit comprising the two biasing transformers in a manner similar to that shown in Figure 10. This arrangement, however, differs from Figure 10 in that, if one of the three phase feeders 200 and 201 carries more current than the other but both remain sound, the load currents still summate to zero and no currents will flow in either the restraining windings 5 or the operating windings 6. If a fault to earth occurs for example on one of the phases of the feeder 201 then the secondary currents of the current transformers 4 of this feeder no longer summate to zero and current due to leakage flows in the protective circuits, part flowing through the restraining winding 5 of the biasing transformer associated with the faulty feeder 201 and part through the operating winding 6 of each biasing transformer. These currents then combine and return through the restraining winding 5 of the biasing transformer associated with the sound feeder 200 to the current transformers 4 associated with the faulty feeder 201. It will be noted that the restraining winding 5 of the biasing transformer associated with the faulty feeder 201 is excited to a less extent than the restraining winding 5 of the biasing transformer associated with the sound feeder 200 with the result that the faulty feeder only is isolated. This arrangement is useful for protecting from earth or leakage faults in parallel polyphase circuits where owing to dissimilar resistance or impedance the load currents are not equally shared.

Figure 13:
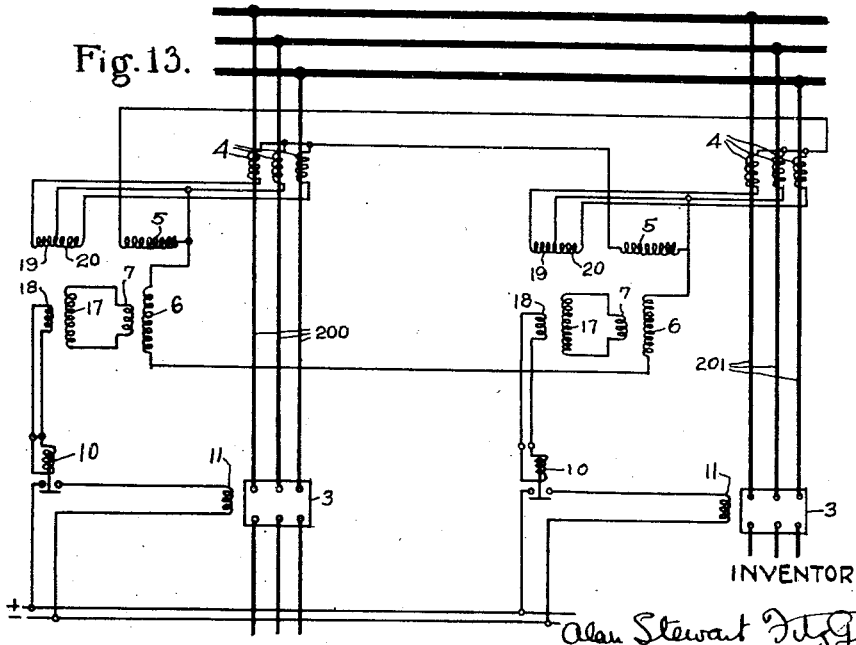

Figure 13 shows a further improvement on the arrangement described in Figure 12 adapted to achieve the following object. It is well known that current transformers do not preserve their correct ratio when subjected to very heavy overloads, and further that commercially similar current transformers when subject to like disturbances do not always behave in an exactly similar manner. This may have the result that heavy overloads whose primary currents summate to zero, may give rise to secondary currents which do not summate to zero, due to slight variations in the ratio of the current transformers. Moreover, the impedance of the primary circuits may differ and under these conditions, incorrect operation of a scheme similar to Figure 12 may result. In order to avoid this, instead of connecting secondary winding 7 directly to relay 10, I connect it to the operating winding 17 of another biasing transformer which may be of the form illustrated in Figure 4 and which has its secondary winding 18 connected to the relay 10. This additional biasing transformer has its restraining winding divided into two equal parts 19 and 20, each of which is connected in series with a current transformer 4. This biasing transformer has, as heretofore described, its restraining winding 19—20 arranged so as to produce no electro-motive force at the terminals of the operating and secondary windings 17 and 18 respectively, which are inductively related to each other. By the provision of an air gap on the central limb of this additional biasing transformer comprising the windings 17, 18, 19, 20 the restraint due to windings 19 and 20 can be made negligible for normal load currents. Therefore, the operation of relay 10 would be achieved by double transformation in a manner precisely similar to that described with regard to Figure 12, the faulty feeder carrying the greater current due to leakage to ground being tripped out.

The biasing transformer may be designed to give the maximum possible sensitivity under normal loads since due to restraining windings 19 and 20, the fault setting may be arranged to be augmented automatically in accordance with increase of load on the feeders considerably in excess of the normal. When, therefore, due to severe faults on the remote part of the distribution network, both feeders are carrying exceptionally heavy currents, there will be no tendency for relay 10 to be tripped incorrectly. Since this latter tendency is frequently the limiting feature in obtaining sensitive operation with protective gear of this nature, this latter arrangement results in the achievement of more sensitive operation and greater stability.

The arrangements shown in Figure 12 and Figure 13 are equally adapted for the protection of more than two feeders, the diagram being extended in accordance with the principles described with regard to Figure 11.

Further difficulties are frequently met with in such systems of parallel circuit protection due to the fact that where a plurality of such circuits are protected, special switching means are necessary in order to insure that the switching out of service of any one circuit is not detrimental to the proper functioning of the protective gear on the remaining circuits. This results frequently in transient energization of the protective apparatus during the ordinary operations of switching, and considerable care and thought have to be given to this aspect of the subject, in order to avoid the improper operation of the protective gear.

The circumstances under which such conditions arise may be more clearly realized if reference be again made to Figure 9 in which the bus bar 1 may be considered as the source of energy, both circuit breakers 3 being closed. Let it be supposed, however, that at the remote end of one of the two feeders, for example the feeder 201, the circuit breaker is open and such current as may be supplied to the distant station will flow only in the other feeder 201, then this feeder, carrying a greater current than the feeder 200, in which the current is zero, would tend to be tripped out.

It is usually found that either the fault settings of the relays etc., employed must be arranged to considerably exceed the order of current normally flowing in the circuits or that kick fuses have to be employed, or alternatively, that certain switching operations have to be carried out in the protective circuit prior to the operation of the main switches or circuit breakers. It is in general most undesirable that the employment of protective means should interfere with normal functions.

The employment of sensitive means of protection is associated with the use of earthing resistances or reactors connected between the neutral point of the sources of supply and ground, having the effect of limiting the earth fault current which may flow. By the employment of such means of protection, therefore, it is possible to clear sections suffering breakdown of insulation prior to the formation of a short circuit, thereby reducing general disturbances on the system. The employment of sensitive fault settings, therefore, is definitely associated with earth faults as distinct from line faults.

By the provision of protective means for parallel feeders, in which separate relays are provided for protection from earth faults and faults between phases, the difficulties in connection with switching operations above referred to may be entirely avoided for the following reasons.

If the settings of the line fault relays correspond to currents considerably exceeding those normally flowing in the circuits, adequate protection will be given as explained above, owing to the heavy currents always associated with faults between phases, but operation of the protective gear will not occur due to switching operations involving currents of normal magnitude, nor will operation of the earth fault relay be affected by load currents. These latter, therefore, may be set for values very much less than those associated with normal flow of current in the protected circuits.

In Figure 14, therefore, I provide two relays per feeder, 10 and 14, the former of these being operated by earth faults and the latter by line faults.

In order to carry out the various discriminating functions, I provide in connection with each feeder three transformer cores, two of these being biasing transformers and one an ordinary current or auxiliary transformer having a secondary winding 16, and a primary winding 15, this latter being provided with a mid-point tapping.

I show as in previous diagrams parallel feeders 200 and 201 connected to a common bus bar 1 and provided each with three current transformers 4. Circuit breakers 3 are provided, each arranged to be tripped by the adjacent relays 10 and 14.

The secondary windings of the current transformers 4 are connected as shown to the primary windings 15 of the additional current transformers. The connections for the secondary windings 16 of the additional current transformers and the restraining and operating windings 21 and 22 respectively of the biasing transformers are identical with those shown in Figure 10 for the current transformers 4 and the restraining and operating windings 5 and 6 respectively of the biasing transformers and the operation is also the same.

It will be seen that currents in any two or more of the phases of the feeders 200, 201 will cause secondary current to flow either in the whole or one half of the primary windings 15, and corresponding currents in the secondary windings 16. Under all conditions, therefore, in which the currents in the feeders are similar, the currents in the secondary windings 16 will be similar, and no difference currents will appear in the operating windings 22. Operation of the relays 14, therefore, will be caused by faults between phases on the feeders 200, 201. The operation of the relay 10 will occur due to earth faults in precisely the same manner as is described in regard to Figure 12. In Figure 15, I show a similar arrangement giving protection from faults between phases and earth faults with the addition that I have a third biasing transformer having an operating winding 17, a secondary winding 18 and the restraining windings 19 and 20; the object of the latter improvement being as described hereinbefore.

Figure 16:
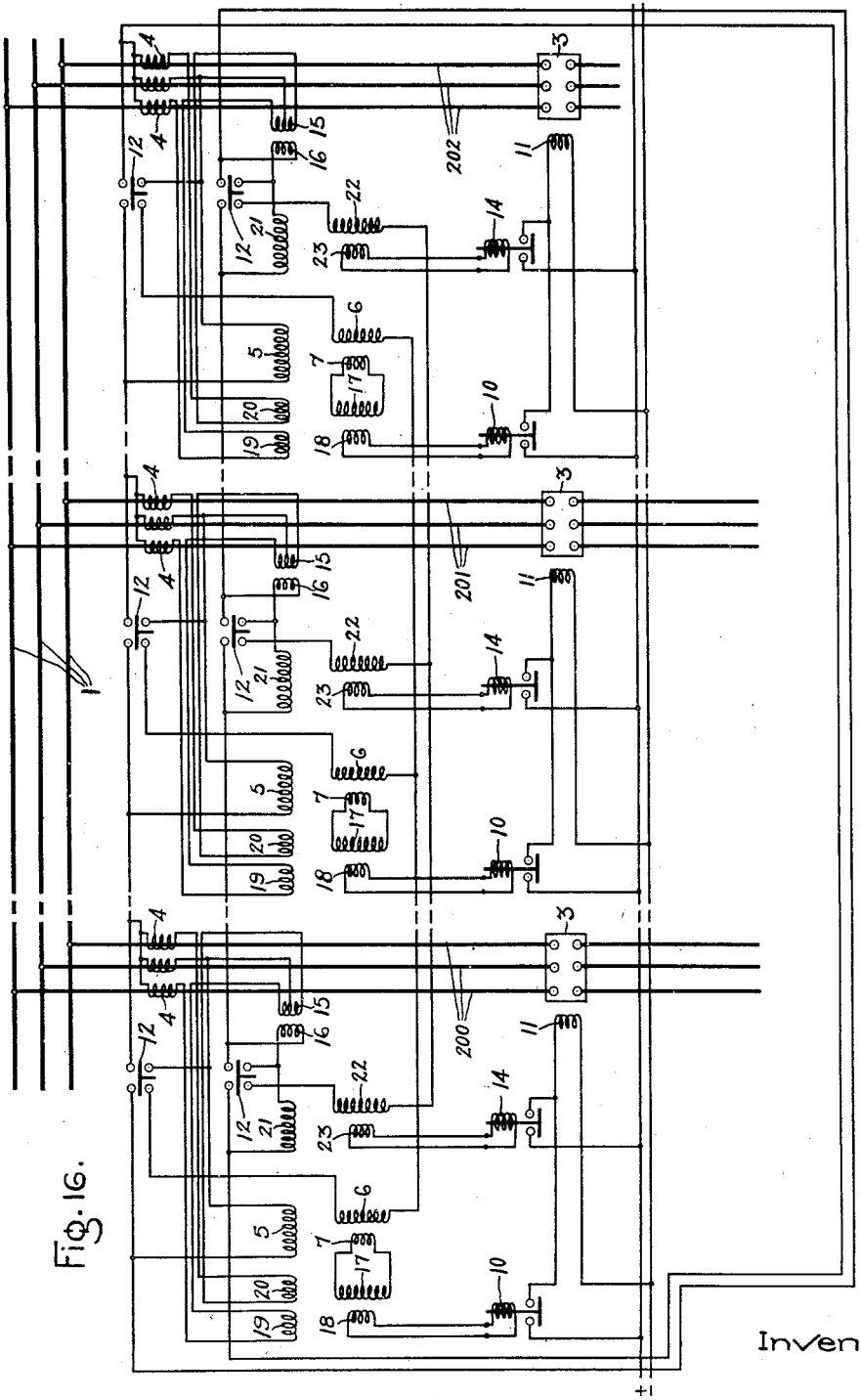

In Figure 16, I show an arrangement on the lines of Figure 15 but adapted for more than two feeders 200, 201, 202, auxiliary switches being provided in accordance with the requirements indicated in the description referring to Figure 11.

It will be understood that the arrangements hereinbefore described are applicable not only to feeders but to any other form of parallel circuits or windings, for example, the windings of machines or transformers.

Where I employ a bias due to overload in the biasing transformer, I prefer to use a construction involving an air-gap. Where, however, I employ a discriminating bias I prefer a construction without air-gap. For example, Figure 9 shows a discriminating arangement and the biasing transformer core will be constructed for example like Figures 1 and 3 with the middle limb closed. There is no air-gap in the core of the biasing transformer used in Figure 12 because this is a discriminating arrangement and no overloads appear in the restraining windings 5.

As regards Figures 10 and 11, this arrangement gives overload and discriminating bias and no air-gap is necessary but it is possible to use an air-gap and the best arrangement will be a small air-gap.

Referring to Figure 13, the biasing transformer 5, 6, 7, will have no air-gap but the biasing transformer 19, 20, 18, 17, will have an air-gap because this transformer is restrained in accordance with the overload currents flowing in the feeder.

In Fig. 13 with reference to the biasing transformer having windings 19 and 20 the mid-point of which is tapped, it is necessary to divide the winding into four parts if a biasing transformer like Figure 3 is employed. In other words, this restraining winding will have a turn 19 on the left hand limb and a turn 19 on the right hand limb; also a turn 20 on the left hand limb and a turn 20 on the right hand limb, the tapping being taken from the mid-point. If, however, the construction of the biasing transformer shown in Figure 2 is employed the restraining winding will have two parts only, and the tapping taken between them.

Referring to Figure 14, 15, 16, is a plain transformer with no air-gap. Again there is no air-gap in the core of the biasing transformer 5, 6, 7, and with regard to the biasing transformer 21, 22 and 23, I do not use an air-gap because I am not seeking sensitivity at normal load. If, however, I did want to obtain sensitivity then I would use a small air-gap but it would make the discrimination more difficult to obtain.

With regard to Figure 15, again the biasing transformer 5, 6, 7, does not employ an air-gap but the biasing transformer 19, 20, 18, 17, does have an air-gap. The biasing transformer 21, 22 and 23, may have an air-gap or may not as desired.

I consider the hereinbefore described protective apparatus much superior to previous arrangements employing biased relays. The biasing transformer is made up of standard punchings on which the windings are mounted and the transformer may be fixed to the lid of a sheet-iron or cast iron box, the core and windings being embedded in compound. The ends of the various windings lead out to terminals on the lid to which the current transformers and relays are connected. Simple relays are employed and the whole apparatus is reliable and requires little attention in service.

What I claim as new and desire to secure by Letters Patent of the United States, is:

1. A protective arrangement for parallel alternating electric current circuits comprising biasing transformers associated with the individual circuits and having their windings so connected and arranged that current in the secondary winding of the biasing transformer of one circuit is restrained by current proportional to the current in another circuit.

2. A protective arrangement for parallel alternating electric current circuits comprising switching means therefor and a biasing transformer associated with each circuit and provided with an operating winding operatively connected to the circuit, a secondary winding for controlling the switching means of the circuit and a restraining winding for regulating the flux induced in the secondary winding by the operating winding, the arrangement being such that, upon the occurrence of a fault in one of the circuits, the secondary windings of the biasing transformers associated with the sound circuits are restrained from operating the switching means of the sound circuits by current in the restraining windings proportional to the current in the faulty circuit.

3. A protective arrangement for parallel alternating electric current circuits wherein the secondary windings of current transformers respectively associated with the circuits are connected in a closed circuit, comprising biasing transformers respectively associated with the parallel circuits, each having a restraining winding connected in series relation with the closed circuit and an operating winding connected across points in the closed circuit normally at equal potential.

4. A protective arrangement for parallel alternating electric current circuits wherein the secondary windings of current transformers respectively associated with the circuits are connected in a closed circuit, comprising biasing transformers respectively associated with the parallel circuits, each having a restraining winding connected in series relation with the closed circuit and an operating winding connected across points in the closed circuit normally at equal potential and switching means for rendering one of the biasing transformers inoperative when the parallel circuit with which the biasing transformer is associated is out of service.

5. A protective arrangement for parallel alternating electric current circuits wherein the secondary windings of current transformers respectively associated with the circuits are connected in a closed circuit, comprising biasing transformers respectively associated with the parallel circuits, each having a restraining winding connected in series relation with the closed circuit and an operating winding connected across points in the closed circuit normally at equal potential and switching means adapted to be operated to short circuit the secondary winding of one of the current transformers and to open circuit the operating winding and short circuit the restraining winding of one of the biasing transformers when the parallel circuit with which the current transformer and the biasing transformer are associated is out of service.

6. A protective arrangement for parallel alternating electric current circuits comprising biasing transformers respectively associated with the circuits, each having an operating winding connected to be energized in accordance with the difference between the currents in the circuits and a restraining winding connected to be energized by current proportional to the current in the circuits.

7. A protective arrangement for parallel alternating electric current circuits comprising switching means therefor and biasing transformers respectively associated with the circuits, each having an operating winding connected to be energized in accordance with the difference between the currents in the circuits, a secondary winding for controlling the switching means of the circuit, and a restraining winding for regulating the flux induced in the secondary winding by the operating winding connected to be energized by current proportional to the current in the circuits.

8. A protective arrangement for parallel alternating electric current circuits comprising current transformers in each phase of each circuit, the secondary windings of the current transformers for each circuit being end-connected, a closed circuit including the end-connected secondary windings, and biasing transformers respectively associated with the parallel circuits, each comprising a restraining winding in series relation with the closed circuit and an operating winding connected across points in the closed circuit normally at equal potential.

9. A protective arrangement for parallel alternating electric current circuits as claimed in claim 8, in which the current transformers in one parallel circuit are end-connected directly at one end and at the other end through restraining windings of a second biasing transformer associated with said parallel circuit and having an operating winding in circuit with the secondary winding of the other biasing transformer associated with the said parallel circuit.

10. A protective arrangement for parallel alternating electric current circuits comprising a current transformer on each phase of each circuit, the current transformers of each circuit being directly connected at one end and through primary transformer windings at the other end, the sets of current transformers being cross-connected through restraining windings of biasing transformers adapted to yield secondary current and operate the tripping relay of a circuit faulted through leakage to earth, the secondary transformer windings being cross-connected through restraining windings of biasing transformers adapted to yield secondary current and operate the tripping relay of a circuit faulted between phases.

11. A protective arrangement for parallel alternating electric current circuits as claimed in claim 10 with overload restraint on the biasing transformer of the earth fault relay.

12. A protective arrangement for parallel connected alternating electric current circuits comprising current transformers in the phases of the circuits and circuit arrangements for providing current in the event of faults to earth and faults between phases in operating windings of biasing transformers provided with both overload and discriminating bias, substantially as hereinbefore described.

13. In combination with a protective system for alternating electric current distribution system, a biasing transformer comprising a magnetic core having two magnetic circuits and primary, secondary and restraining windings all mounted on the same limb of the magnetic core.

14. A protective arrangement for parallel alternating electric current circuits comprising an auxiliary transformer for each circuit, a current transformer in each phase of each circuit, the current transformers of each circuit being end-connected directly at one end and at the other end through the primary winding of the auxiliary transformer, a circuit interconnecting the end-connected secondary winding of the current transformers, earth fault biasing transformers respectively associated with the parallel circuits, each having a restraining winding in series relation with the interconnecting circuit, and an operating winding connected across points in the interconnecting circuit normally at equal potential and adapted upon the occurrence of a fault to earth on one of the parallel circuits to yield operating currents in the secondary winding of the biasing transformer associated with the faulty circuit, and phase fault biasing transformers respectively associated with the parallel circuits, each having a restraining winding connected in a secondary circuit including the secondary windings of said auxiliary transformers, and an operating winding connected across points in the secondary circuit normally at equal potential and adapted, upon the occurrence of a fault between two of the conductors of one of the parallel circuits to yield operating currents in the secondary winding of the biasing transformer associated with the faulty circuit.

15. A protective arrangement as claimed in claim 14 in which the secondary windings of the current transformers in one of the parallel circuits are end-connected at one end through the primary winding of the auxiliary transformer associated with the circuit and through restraining windings of an additional biasing transformer having its operating winding connected to the secondary winding of the earth fault biasing transformer associated with the circuit.

In witness whereof, I have hereunto set my hand this 6th day of July 1923.

ALAN STEWART FITZ GERALD.